(12) United States Patent
Gao et al.

(10) Patent No.: US 11,575,419 B2
(45) Date of Patent: Feb. 7, 2023

(54) METHOD AND APPARATUS FOR SENDING SIGNAL, METHOD AND APPARATUS FOR REPORTING CHANNEL STATE INFORMATION, AND STORAGE MEDIUM

(71) Applicant: ZTE CORPORATION, Shenzhen (CN)

(72) Inventors: Bo Gao, Shenzhen (CN); Zhaohua Lu, Shenzhen (CN); Hao Wu, Shenzhen (CN); Chuangxin Jiang, Shenzhen (CN); Ke Yao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 76 days.

(21) Appl. No.: 16/973,094

(22) PCT Filed: May 27, 2019

(86) PCT No.: PCT/CN2019/088577
§ 371 (c)(1),
(2) Date: Dec. 8, 2020

(87) PCT Pub. No.: WO2019/233304
PCT Pub. Date: Dec. 12, 2019

(65) Prior Publication Data
US 2021/0258052 A1    Aug. 19, 2021

(30) Foreign Application Priority Data
Jun. 8, 2018 (CN) .......................... 201810589295.9

(51) Int. Cl.
*H04B 7/06* (2006.01)
*H04B 17/336* (2015.01)
*H04W 24/10* (2009.01)

(52) U.S. Cl.
CPC ......... *H04B 7/0617* (2013.01); *H04B 7/0626* (2013.01); *H04B 7/0695* (2013.01); *H04B 17/336* (2015.01); *H04W 24/10* (2013.01)

(58) Field of Classification Search
CPC ................ H04B 7/0617; H04B 7/0626; H04B 7/0695; H04B 17/336
See application file for complete search history.

(56) References Cited

U.S. PATENT DOCUMENTS

2005/0125176 A1   6/2005   Makhlouf et al.
2014/0073313 A1   3/2014   Hammarwall
(Continued)

FOREIGN PATENT DOCUMENTS

CN    102857277 A    1/2013
CN    108092754 A    5/2018
(Continued)

OTHER PUBLICATIONS

Translated Chinese First Office Action, pp. 1-12.
Translated Chinese First Search Report, 1 page.
International Search Report Form PCT/ISA/210, and Written Opinion Form PCT/ISA/237, International Application No. PCT/CN2019/088577, pp. 1-6 International Filing Date May 27, 2019, mailing date of search report Aug. 9, 2019.
(Continued)

*Primary Examiner* — Michael Thier
*Assistant Examiner* — Prince A Mensah
(74) *Attorney, Agent, or Firm* — George McGuire

(57) ABSTRACT

Disclosed are a method and apparatus for sending a signal, a method and apparatus for reporting channel state information, a storage medium and an electronic device. The method for sending the signal includes: a first-type reference signal is sent to a terminal, where the first-type reference signal is associated with a number N of channel feature
(Continued)

hypotheses, and N is an integer greater than or equal to 1; and channel state information sent by the terminal is received.

20 Claims, 4 Drawing Sheets

(56) References Cited

U.S. PATENT DOCUMENTS

| | | | |
|---|---|---|---|
| 2015/0264669 A1* | 9/2015 | Kim | H04W 72/042 |
| | | | 370/329 |
| 2016/0143055 A1* | 5/2016 | Nammi | H04W 74/04 |
| | | | 370/329 |
| 2016/0308652 A1 | 10/2016 | Sun | |
| 2018/0076937 A1* | 3/2018 | Nasiri Khormuji | |
| | | | H04W 72/0453 |
| 2018/0123668 A1* | 5/2018 | Kwak | H04B 7/0626 |
| 2018/0359073 A1* | 12/2018 | Frenne | H04L 5/0085 |
| 2019/0261336 A1* | 8/2019 | Liu | H04L 5/0048 |
| 2019/0364617 A1* | 11/2019 | Wu | H04L 5/005 |
| 2021/0022210 A1* | 1/2021 | Hoshino | H04L 5/0016 |
| 2021/0143870 A1* | 5/2021 | Faxer | H04B 7/0417 |
| 2021/0282041 A1* | 9/2021 | Kwak | H04L 5/0048 |
| 2021/0360625 A1* | 11/2021 | Tang | H04L 5/005 |

FOREIGN PATENT DOCUMENTS

| | | |
|---|---|---|
| CN | 108111276 A | 6/2018 |
| CN | 108111286 A | 6/2018 |
| GB | 2507570 A | 5/2014 |
| WO | 2013141781 A1 | 9/2013 |

OTHER PUBLICATIONS

Translated Second Chinese Office Action—Chinese Application 201810589295.9, filed Jun. 8, 2018. pp. 1-4.
European Search Report—PCT/CN2019/088577, filed May 27, 2019. pp. 1-9.

* cited by examiner

| | Slot-{n-4} CORESET-0: A-1 | Slot-{n-3} CORESET-1: A-2 | Slot-{n-2} CORESET-2: A-3 | Slot-{n-1} CORESET-3: A-1 | Slot-{n} CORESET-0: A-1 |
|---|---|---|---|---|---|
| RB41~60 | | | | | |
| RB21~40 | | | | | UE3-{A-1} |
| RB0~20 | | UE1-{B-2} UE2-{A-2} | | | UE3-{A-1,B-2} |

METHOD AND APPARATUS FOR SENDING SIGNAL, METHOD AND APPARATUS FOR REPORTING CHANNEL STATE INFORMATION, AND STORAGE MEDIUM

The present application is a National Stage Application, filed under 35 U.S.C. 371, of International Patent Application No. PCT/CN2019/088577, filed on May 27, 2019, which claims priority to Chinese patent application No. 201810589295.9 filed with the CNIPA on Jun. 8, 2018, contents of both of which are incorporated herein by reference in their entireties.

TECHNICAL FIELD

The present application relates to the field of communications, and particularly, to a method and apparatus for sending a signal, a method and apparatus for reporting channel state information, a storage medium, and an electronic device.

BACKGROUND

In a process of training antenna weights (also referred to as pre-codes or beams), a high-frequency-band sending end sends a training pilot, a high-frequency-band receiving end receives a channel and performs channel estimation, and then the high-frequency-band receiving end needs to feed back channel state information to the high-frequency-band sending end, so that the sending end and the receiving end can conveniently find a sending-receiving end antenna weight pair required for a multi-channel data transmission from optional sending-receiving end antenna weight pairs for data transmission.

In a 5G communication system, a base station (high-frequency sending end) may have multiple antenna panels, and each antenna panel may generate multiple beams in different directions. The same situation applies to a user equipment (UE) end (high-frequency receiving end). In the related art, the UE end can only feed back channel state information according to a beam, sent by the base station, in a current direction, but cannot perform feedback channel state information of beams in other directions, thus impacting the performance of the 5G system.

SUMMARY

The present application provides a method and apparatus for sending a signal, a method and apparatus for reporting channel state information, a storage medium, and an electronic device.

In an aspect, the present application provides a method for sending a signal. The method is applied to a base station and includes: a first-type reference signal is sent to a terminal, where the first-type reference signal is associated with N channel feature hypotheses, N is an integer greater than or equal to 1; and channel state information sent by the terminal is received.

In another aspect, the present application further provides a method for reporting channel state information. The method is applied to a terminal and includes: a first-type reference signal sent by a base station is received, where the first-type reference signal is associated with N channel feature hypotheses, N is an integer greater than or equal to 1; channel state information is determined according to the N channel feature hypotheses; and the channel state information is sent to the base station.

In another aspect, the present application further provides an apparatus for sending a signal. The apparatus includes a first sending module and a first receiving module. The first sending module is configured to send a first-type reference signal to a terminal, where the first-type reference signal is associated with N channel feature hypotheses, N is an integer greater than or equal to 1. The receiving module is configured to receive channel state information sent by the terminal.

In another aspect, the present application further provides an apparatus for reporting channel state information. The apparatus includes a second receiving module, a determination module and a second sending module. The second receiving module is configured to receive a first-type reference signal sent by a base station, where the first-type reference signal is associated with N channel feature hypotheses, N is an integer greater than or equal to 1. The determination module is configured to determine channel state information according to the N channel feature hypotheses. The second sending module is configured to send the channel state information to the base station.

In another aspect, the present application further provides a storage medium. The storage medium stores a computer program. The computer program, when executed by a processor, implements steps of the method for sending the signal described above.

In another aspect, the present application further provides a storage medium. The storage medium stores a computer program. The computer program, when executed by a processor, implements steps of the method for reporting channel state information described above.

In another aspect, the present application further provides a terminal. The terminal at least includes a memory and a processor. A computer program is stored in the memory. The processor, when executing the computer program in the memory, implements steps of the method for sending the signal described above.

In another aspect, the present application further provides a terminal. The terminal at least includes a memory and a processor. A computer program is stored in the memory. The processor, when executing the computer program in the memory, implements steps of the method for reporting the channel state information described above.

The N channel feature hypotheses are configured on the first-type reference signal, the feedback of the channel state information of a receiving end in directions of other specified beams is realized, an indication of virtual sending beams is effectively supported, and thus the performance of the system is remarkably improved.

DETAILED DESCRIPTION

The present application provides a method and apparatus for sending a signal, a method and apparatus for reporting channel state information, a storage medium, and an electronic device. The present application is described in further detail below in conjunction with drawings and embodiments. It is to be understood that the specific embodiments described herein are for purposes of explanation only and are not limiting of the present application.

Figure 1:
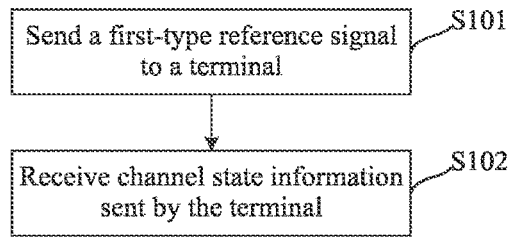
FIG. 1 is a flowchart of a method for sending a signal in a first embodiment of the present application.

A first embodiment of the present application provides a method for sending a signal. The method is mainly applied to a base station side in a 5G system. As shown in FIG. 1, and the flowchart of the method mainly includes steps S101 and S102.

In S101, a first-type reference signal is sent to a terminal.

In S102, channel state information sent by the terminal is received.

Ultra-wide bandwidth high frequency band (namely millimeter wave communication) has become an important direction for the development of mobile communication in the future, and attracts the attention of global academic and industrial circles. In particular, the advantages of the millimeter wave has become increasingly attractive for its advantages in the current situation of increasing spectrum resource congestion and the large number of accessing physical networks. The standardization work of the millimeter wave communication has started in many standard organizations, such as an institute of electrical and electronics engineers (IEEE), a 3rd generation partnership project (3GPP). For example, in a 3GPP standard group, high-frequency communications will become an important innovative point for 5G new radio access technology (New RAT) by virtue of their significant advantage of large bandwidth.

In the 5G communication system, the base station may have multiple antenna panels, and each antenna panel may generate multiple beams. The same situation applies to the UE. A feedback of the channel state information related to a virtual sending beam and a feedback of the channel state information related to a digital beam are independently decoupled. There is a case that different virtual sending beam indications exist under a same digital beam, and at this time, the channel state information fed back by the UE is determined based on the digital beam sent by the base station, when the cross-carrier or switching between different resource blocks (RBs) is considered, the UE side cannot virtually send the feedback of the channel state information in a beam direction, and thus the performance of the 5G system is impacted.

In the present embodiment, the first-type reference signal sent by the base station to the terminal may represent a potential optional beam through which the base station wishes to perform data transmission with the terminal. The beam may be a resource (e.g., a sending-end spatial filter, a receiving-end spatial filter, sending-end precoding, receiving-end precoding, an antenna port, an antenna weight vector, an antenna weight matrix), and a sequence number of the beam may be replaced with a resource index (e.g., a reference signal resource index), since the beam may be bound with some time-frequency code resources in terms of transmission; the beam may also be a transmission (sending/receiving) manner, which may in particular include spatial division multiplexing, frequency/time domain diversity, etc.

The first-type reference signal at least includes one or a combination of several of following signals, for example, a channel state information reference signal (CSI-RS), a synchronization signal block (SSB), a synchronization signal/physical broadcast channel (SS/PBCH), and a de-modulation reference signal.

Figure 2:
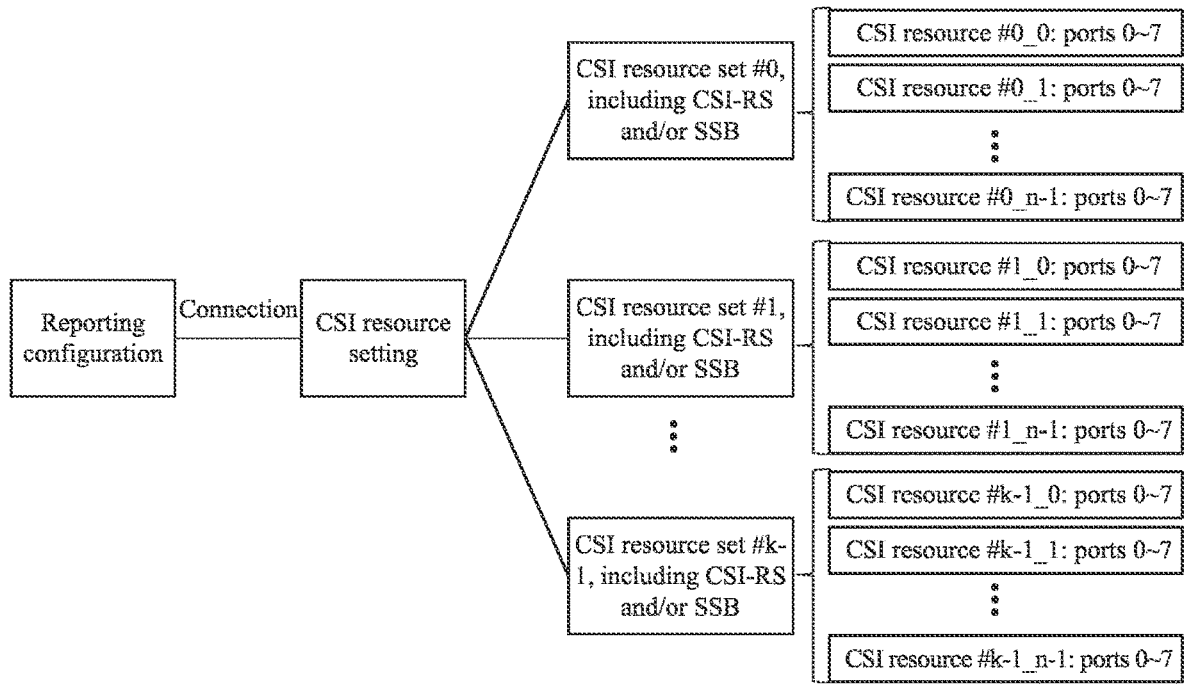
FIG. 2 is a schematic diagram of a configuration of a first-type reference signal in the first embodiment of the present application.

Specifically, the first-type reference signal may be composed of at least one of following resources: a first-type reference signal port group, a first-type reference signal resource, a first-type reference signal resource group, a first-type reference signal resource configuration, a first-type reference signal antenna port, or a first-type reference signal antenna port group. For example, when the first-type reference signal is CSI-RS, the schematic diagram of the configuration of the first-type reference signal is shown in FIG. 2, and a reporting configuration (reporting setting) is associated with one or more (not shown in FIG. 2) reference signal resource configurations (i.e., CSI resource settings); while each CSI resource setting includes k reference signal resource sets (CSI resource sets); each CSI resource setting includes multiple CSI-RS resources or SS blocks, and each reference signal resource includes several ports or port groups. Through such multi-layer structure, a base station end can effectively restrict the configuration of the base station end on different layers. Further, "simultaneous sending" or "simultaneous reception" of two or more reference signals may be represented by the configuration of the two or more reference signals in a same reference signal resource, or a same set of reference signal resources, or a same reference signal resource configuration, or a same report configuration.

The first-type reference signal sent by the base station is associated with N channel feature hypotheses at the same time, where N is an integer greater than or equal to 1. Further, the channel feature hypothesis may be one or more of: quasi-co-location (QCL), spatial QCL, a transmission configuration indication state (TCI), spatial filter information, and antenna group information. The quasi-co-location is composed of one or more reference RSs and a quasi-co-location parameter associated with the reference RSs, and parameters involved in the quasi-co-location at least include one or a combination of following parameters: Doppler spread, Doppler shift, delay spread, an average delay, an average gain, and a spatial parameter; further, the spatial parameter may include a spatial receive parameter such as angle of arrival, spatial correlation of receive beams, an average delay, correlation of time-frequency channel responses (including phase information). The spatial filter information may be spatial filter configuration information to be realized by a UE end as wished by the base station, or may be spatial filter configuration information of the base station itself; the antenna group is similar to the spatial filter information, which will not be described in detail here.

The first-type reference signal generally includes following signaling associated with the first-type reference signal:

first-type reference signal configuration signaling, first-type report configuration signaling, first-type reference signal measurement configuration signaling, or first-type reference signal measurement restriction signaling. Specifically, the N channel feature hypotheses are carried by at least one or more of the signaling described above, and the N channel feature hypotheses and the first-type reference signal are sent to the terminal at the same time.

In this embodiment, the N channel feature hypotheses at least include one of following types: a first-type channel feature hypothesis, a second-type channel feature hypothesis, or a third-type channel feature hypothesis. The first-type channel feature hypothesis is a channel feature hypothesis of the first-type reference signal, namely, the channel feature hypothesis corresponding to a beam, and is mainly configured on the first-type reference signal resource as an inherent channel feature of this reference signal resource, in other words, if only this reference signal resource is considered, the first-type channel feature hypothesis is an assumed channel feature that needs to be considered from the perspective of the UE end (user end). The second-type channel feature hypothesis is a virtual channel feature hypothesis associated with the first-type reference signal, namely, a channel feature hypothesis of an analog beam which the base station wishes the terminal to receive at the same time. The third-type channel feature hypothesis is an interference channel feature hypothesis associated with the first-type reference signal, namely, a channel feature hypothesis of an analog beam which the base station wishes the terminal to avoid receiving at the same time.

Specifically, the second-type channel feature hypothesis may be a channel feature hypothesis of a reference signal and/or a data channel and/or a control channel associated with the first-type reference signal, or description information may be added on the basis of the reference signal and/or the data channel and/or the control channel associated with the first-type reference signal so as to determine the second-type channel feature hypothesis. The first-type reference signal and the reference signal associated with the first-type reference signal are configured in a same resource or a same resource set or a same resource configuration or a same report configuration; here, the reference signal associated with the first-type reference signal may be any reference signal associated with the first-type reference signal, and does not specifically refer to a specific reference signal. Further, the second-type channel feature hypothesis may be a channel feature hypothesis of a reference signal and/or a data channel and/or a control channel sent simultaneously with the first-type reference signal, or the second-type channel feature hypothesis may be determined by the reference signal and/or the data channel and/or the control channel sent simultaneously with the first-type reference signal. Further, the second-type channel feature hypothesis may also be a channel feature hypothesis of a reference signal and/or a data channel and/or a control channel received simultaneously with the first-type reference signal, or the second-type channel feature hypothesis may be determined by the reference signal and/or the data channel and/or the control channel received simultaneously with the first-type reference signal. Simultaneous reception refers to that when the base station sends the first-type reference signal and the reference signal associated with the first-type reference signal to the terminal, the base station does not simultaneously send both of the signals, and the terminal still needs to prepare to simultaneously receive the first-type reference signal and the reference signal associated with the first-type reference signal according to the second channel feature hypothesis. In this embodiment, the second-type channel feature hypothesis is mainly carried by the first-type reference signal measurement configuration signaling and/or signaling associated with the first-type reference signal measurement restriction signaling.

Further, the second-type channel feature hypothesis is valid when a first preset condition is satisfied, and when the base station sends the first-type reference signal to the terminal, the first preset condition may be sent to the terminal at the same time; moreover, an indication that the second-type channel feature hypothesis is valid when the terminal specifically satisfies which condition in the first preset condition may be sent to the terminal at the same time. That is, when the terminal receives the second-type channel feature hypothesis and at least one of following conditions is satisfied, the terminal needs to take into consideration the second-type channel feature hypothesis while feeding back the channel state information:

(1) the second-type channel feature hypothesis includes spatial quasi-co-location;

(2) the second-type channel feature hypothesis is associated with a time window;

(3) the second-type channel feature hypothesis is associated with an aperiodic trigger state of the first-type reference signal;

(4) the second-type channel feature hypothesis is associated with activation signaling of the first-type reference signal;

(5) the second-type channel feature hypothesis is carried in the activation signaling of the first-type reference signal;

(6) enabling information of the second-type channel feature hypothesis is carried in first-type reference signal configuration signaling;

(7) the enabling information of the second-type channel feature hypothesis is carried in first-type report configuration signaling;

(8) the enabling information of the second-type channel feature hypothesis is carried in first-type reference signal measurement configuration signaling; or (9) the enabling information of the second-type channel feature hypothesis is carried in the first-type reference signal measurement restriction signaling.

In an embodiment, the first preset condition may further include one of:

(10) spatial filter repetitive signaling of a first-type reference signal resource set is not configured; or

(11) the spatial filter repetitive signaling of the first-type reference signal resource set is disabled.

In an embodiment, in the first preset condition, conditions that cannot occur simultaneously with conditions (10) and (11) further include:

(12) spatial filter repetitive signaling of a first-type reference signal resource set is configured; or

(13) the spatial filter repetitive signaling of the first-type reference signal resource set is enabled.

In addition, the third-type channel feature hypothesis is determined at least according to one of following reference signals: an interference measurement reference signal generated when the first-type reference signal is sent, an associated reference signal sent to other terminals at the same time, or an interference measurement reference signal of the third-type reference signal associated with the first-type reference signal. Specific types and forms of the third-type reference signal are not specifically limited herein as long as the third-type reference signal is the reference signal associated with the first-type reference signal.

Specifically, the third-type channel feature hypothesis may be a channel feature hypothesis of an interference measurement reference signal and/or an interference channel associated with the first-type reference signal, or description information may be added on the basis of the interference measurement reference signal and/or a data channel and/or a control channel associated with the first-type reference signal so as to determine the third-type channel feature hypothesis. The first-type reference signal and the interference measurement reference signal associated with the first-type reference signal are configured in a same resource or a same resource set or a same resource configuration or a same report configuration, the interference measurement reference signal is an interference measurement reference signal generated at the same time as the base station sends the first-type reference signal, the existence of the interference measurement reference signal may impact the transmission stability of the 5G system, and the impact of the interference measurement signal on the data transmission should be reduced during actual data transmission. Further, the third-type channel feature hypothesis is a channel feature hypothesis of an interference measurement reference signal and/or an interference channel sent simultaneously with the first-type reference signal, or the third-type channel feature hypothesis is determined by the interference measurement reference signal and/or a data channel and/or a control channel sent simultaneously with the first-type reference signal. Further, the third-type channel feature hypothesis may be a channel feature hypothesis of an interference measurement reference signal and/or an interference channel received simultaneously with the first-type reference signal, or the third-type channel feature hypothesis is determined by the interference measurement reference signal and/or a data channel and/or a control channel received simultaneously with the first-type reference signal. Simultaneous reception refers to that when the base station sends the first-type reference signal and the interference measurement reference signal associated with the first-type reference signal to the terminal, the base station does not simultaneously send both of the signals, and the terminal still needs to prepare to simultaneously receive the first-type reference signal and the interference measurement reference signal associated with the first-type reference signal according to the third channel feature hypothesis. In this embodiment, the third-type channel feature hypothesis is mainly carried by the first-type reference signal measurement configuration signaling and/or signaling associated with the first-type reference signal measurement restriction signaling.

Further, the third-type channel feature hypothesis is valid when a second preset condition is satisfied, and when the base station sends the first-type reference signal to the terminal, the second preset condition may be sent to the terminal at the same time; moreover, an indication that the third-type channel feature hypothesis is valid when the terminal specifically satisfies which condition in the second preset condition may be sent to the terminal at the same time. That is, when the terminal receives the third-type channel feature hypothesis and at least one of following conditions is satisfied, the terminal needs to take into consideration the third-type channel feature hypothesis while feeding back the channel state information:

(1) the third-type channel feature hypothesis includes spatial quasi-co-location;

(2) the third-type channel feature hypothesis is associated with a time window;

(3) the third-type channel feature hypothesis is associated with an aperiodic trigger state of the first-type reference signal;

(4) the third-type channel feature hypothesis is associated with activation signaling of the first-type reference signal;

(5) the third-type channel feature hypothesis is carried in the activation signaling of the first-type reference signal;

(6) enabling information of the third-type channel feature hypothesis is carried in first-type reference signal configuration signaling;

(7) the enabling information of the third-type channel feature hypothesis is carried in first-type report configuration signaling;

(8) the enabling information of the third-type channel feature hypothesis is carried in first-type reference signal measurement configuration signaling; or (9) the enabling information of the third-type channel feature hypothesis is carried in the first-type reference signal measurement restriction signaling.

In an embodiment, the second preset condition may further include one of:

(10) spatial filter repetitive signaling of a first-type reference signal resource set is not configured; or

(11) the spatial filter repetitive signaling of the first-type reference signal resource set is disabled.

In an embodiment, in the second preset condition, conditions that cannot occur simultaneously with conditions (10) and (11) further include:

(12) spatial filter repetitive signaling of a first-type reference signal resource set is configured; or

(13) the spatial filter repetitive signaling of the first-type reference signal resource set is enabled.

In this embodiment, the first-type report configuration signaling of the first reference signal sent by the base station may also be used for instructing the terminal to determine the channel state information based on at least one of following channel feature hypotheses: a first-type channel feature hypothesis, the first-type channel feature hypothesis and a second-type channel feature hypothesis, the first-type channel feature hypothesis and a third-type channel feature hypothesis, or the first-type channel feature hypothesis and the second-type channel feature hypothesis and the third-type channel feature hypothesis. It should be appreciated that since the first-type channel feature hypothesis is used as an inherent channel feature hypothesis of the first-type reference signal and corresponds to a channel feature hypothesis of beams actually sent by the base station, the first-type channel feature hypothesis is certainly indicated when the first-type report configuration signaling is used for indication; the second-type channel feature hypothesis actually indicates that the terminal receives another or several virtual sending beams while receiving the beam, the base station may not directly send these virtual sending beams at present, but may schedule or use the virtual sending beams in a subsequent transmission process, therefore the first-type report configuration signaling may inform the terminal whether to consider the second-type channel feature hypothesis or not according to an actual transmission condition of the base station; the third-type channel feature hypothesis actually indicates that the terminal does not receive another or several virtual sending beams while receiving the beams, so that the virtual sending beams are prevented from interfering with the actually sent beams. Therefore, the first-type report configuration signaling may inform the terminal whether to consider the third-type channel feature hypothesis or not according to the interference condition of the base station.

In order to enable this configuration to be used in a subsequent data transmission, a fourth-type reference signal and/or a data channel and/or a control channel may also be configured to be associated with at least one of following channel feature hypotheses of the first-type reference signal: the first-type channel feature hypothesis, the first-type channel feature hypothesis and the second-type channel feature hypothesis, the first-type channel feature hypothesis and the third-type channel feature hypothesis, or the first-type channel feature hypothesis, the second-type channel feature hypothesis and the third-type channel feature hypothesis. The fourth-type reference signal may be the first-type reference signal or the second-type reference signal or the third-type reference signal which are subsequently sent to other users by the base station.

Further, a fifth-type reference signal and/or a data channel and/or a control channel may also be configured to be associated with a sixth-type reference signal, and an association relationship described above is a channel feature hypothesis satisfying at least one or a combination of following conditions: the first-type channel feature hypothesis, or the second-type channel feature hypothesis, or the third-type channel feature hypothesis. It should be appreciated that the use of the fifth-type reference signal and the sixth-type reference signal in this embodiment is intended to indicate that any two reference signals may be associated with each other, and that the fifth-type reference signal and the sixth-type reference signal may be one or more of all reference signals in this embodiment.

After receiving the channel state information fed back by the terminal, the base station determines, according to a specific content of the channel state information fed back by the terminal, a specific sending-receiving end antenna weight pair for performing the data transmission with the terminal, so as to perform the actual data transmission.

According to this embodiment, the N channel feature hypotheses are configured on the first-type reference signal, the feedback of the channel state information of a receiving end in directions of other specified beams is realized, an indication of the virtual sending beams is effectively supported, and thus the performance of the system is remarkably improved.

Figure 3:
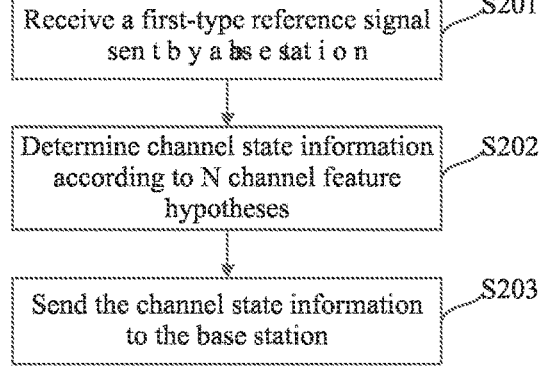
FIG. 3 is a flowchart of a method for reporting channel state information in a second embodiment of the present application.

A second embodiment of the present application provides a method for reporting channel state information. The method is mainly applied to a terminal side or a user side in a 5G system. As shown in FIG. 3, the flowchart of the method mainly includes steps S201 to S203.

In S201, a first-type reference signal sent by a base station is received.

In S202, channel state information is determined according to N channel feature hypotheses.

In S203, the channel state information is sent to the base station.

In this embodiment, the first-type reference signal received by the terminal may represent a potential optional beam through which the base station wishes to perform data transmission with the terminal. The beam may be a resource (e.g., a sending-end spatial filter, a receiving-end spatial filter, sending-end precoding, receiving-end precoding, an antenna port, an antenna weight vector, an antenna weight matrix), and a sequence number of the beam may be replaced with a resource index (e.g., a reference signal resource index), since the beam may be bound with some time-frequency code resources in terms of transmission; the beam may also be a transmission (sending/receiving) manner, which may in particular include spatial division multiplexing, frequency/time domain diversity, etc.

The first-type reference signal at least includes one or a combination of several of following signals, for example, a channel state information reference signal, a synchronization signal block, a synchronization signal/physical broadcast channel, and a de-modulation reference signal. Specifically, the first-type reference signal may be composed of at least one of following resources, for example, the first-type reference signal port group, the first-type reference signal resource, the first-type reference signal resource group, the first-type reference signal resource configuration, the first-type reference signal antenna port, or the first-type reference signal antenna port group.

The first-type reference signal sent by the base station is associated with N channel feature hypotheses at the same time, where N is an integer greater than or equal to 1. Further, the channel feature hypothesis may be one or more of: quasi-co-location, spatial quasi-co-location, a transmission configuration indication state, spatial filter information, and antenna group information. Parameters involved in the quasi-co-location at least include: Doppler spread, a Doppler shift, delay spread, an average delay, an average gain, and a spatial parameter. The spatial filter information may be spatial filter configuration information to be realized by a UE end as wished by the base station, or may be spatial filter configuration information of the base station itself; the antenna group is similar to the spatial filter information, which will not be described in detail here.

The first-type reference signal generally includes following signaling associated with the first-type reference signal: first-type reference signal configuration signaling, first-type report configuration signaling, first-type reference signal measurement configuration signaling, or first-type reference signal measurement restriction signaling. Specifically, the N channel feature hypotheses are carried by at least one or more of the signaling described above, and the N channel feature hypotheses and the first-type reference signal are sent to the terminal at the same time.

The terminal generally determines the channel state information for feedback according to the N channel feature hypotheses associated with the first-type reference signal, and sends the channel state information to the base station.

Specifically, when the terminal receives the first-type reference signal sent by the base station, the terminal may receive the first-type reference signal and a second-type reference signal sent by the base station at the same time, or the base station does not send the first-type reference signal and the second-type reference signal at the same time, but the terminal needs to prepare to receive at the same time. Further, the first-type reference signal and the second-type reference signal are configured in a same resource or a same resource set or a same resource configuration or a same report configuration, or the second-type reference signal at least include a reference signal associated with the first-type reference signal and/or an interference measurement reference signal associated with the first-type reference signal. Then, a reference signal resource set may be determined according to the first-type reference signal and/or the second-type reference signal, and then the channel state information is determined according to the reference signal resource set and sent to the base station, specifically, the number of reference resource sets may be M, where M is an integer larger than or equal to 1, specific content of the reference resource set is a reference signal resource, a reference resource group, a reference resource configuration and the like corresponding to the reference signal.

After the N channel feature hypotheses associated with the first-type reference signal are received, the terminal determines an actual configuration of a spatial filter of the terminal itself according to the N channel feature hypotheses, so that a panel in the terminal may perform a receiving configuration according to corresponding channel feature hypotheses upon receiving a beam sent by the base station.

In this embodiment, the N channel feature hypotheses at least include one of following types: a first-type channel feature hypothesis, a second-type channel feature hypothesis, or a third-type channel feature hypothesis. The first-type channel feature hypothesis is a channel feature hypothesis of the first-type reference signal, namely, the channel feature hypothesis corresponding to a beam, and is mainly configured on the first-type reference signal resource as an inherent channel feature of this reference signal resource, in other words, if only this reference signal resource is considered, the first-type channel feature hypothesis is an assumed channel feature that needs to be considered from the perspective of the UE end (user end). The second-type channel feature hypothesis is a virtual channel feature hypothesis associated with the first-type reference signal, namely, a channel feature hypothesis of an analog beam which the base station wishes the terminal to receive at the same time. The third-type channel feature hypothesis is an interference channel feature hypothesis associated with the first-type reference signal, namely, a channel feature hypothesis of an analog beam which the base station wishes the terminal to avoid receiving at the same time.

Specifically, the second-type channel feature hypothesis may be a channel feature hypothesis of a reference signal and/or a data channel and/or a control channel associated with the first-type reference signal, or description information may be added on the basis of the reference signal and/or the data channel and/or the control channel associated with the first-type reference signal so as to determine the second-type channel feature hypothesis. The first-type reference signal and the reference signal associated with the first-type reference signal are configured in a same resource or a same resource set or a same resource configuration or a same report configuration; here, the reference signal associated with the first-type reference signal may be any reference signal associated with the first-type reference signal, and does not specifically refer to a specific reference signal. Further, the second-type channel feature hypothesis may be a channel feature hypothesis of a reference signal and/or a data channel and/or a control channel sent simultaneously with the first-type reference signal, or the second-type channel feature hypothesis may be determined by the reference signal and/or the data channel and/or the control channel sent simultaneously with the first-type reference signal. Further, the second-type channel feature hypothesis may also be a channel feature hypothesis of a reference signal and/or a data channel and/or a control channel received simultaneously with the first-type reference signal, or the second-type channel feature hypothesis may be determined by the reference signal and/or the data channel and/or the control channel received simultaneously with the first-type reference signal. Simultaneous reception refers to that when the base station sends the first-type reference signal and the reference signal associated with the first-type reference signal to the terminal, the base station does not simultaneously send both of the signals, and the terminal still needs to prepare to simultaneously receive the first-type reference signal and the reference signal associated with the first-type reference signal according to the second channel feature hypothesis. In this embodiment, the second-type channel feature hypothesis is mainly carried by the first-type reference signal measurement configuration signaling and/or signaling associated with the first-type reference signal measurement restriction signaling.

Further, the second-type channel feature hypothesis is valid when a first preset condition is satisfied, namely, the terminal needs to consider the channel feature hypothesis when determining the channel state information. When the base station sends the first-type reference signal to the terminal, the first preset condition may be sent to the terminal at the same time; moreover, an indication that the second-type channel feature hypothesis is valid when the terminal specifically satisfies which condition in the first preset condition may be sent to the terminal at the same time. That is, when the terminal receives the second-type channel feature hypothesis and at least one of following conditions is satisfied, the terminal needs to take into consideration the second-type channel feature hypothesis while feeding back the channel state information:

(1) the second-type channel feature hypothesis includes spatial quasi-co-location;

(2) the second-type channel feature hypothesis is associated with a time window;

(3) the second-type channel feature hypothesis is associated with an aperiodic trigger state of the first-type reference signal;

(4) the second-type channel feature hypothesis is associated with activation signaling of the first-type reference signal;

(5) the second-type channel feature hypothesis is carried in the activation signaling of the first-type reference signal;

(6) enabling information of the second-type channel feature hypothesis is carried in first-type reference signal configuration signaling;

(7) the enabling information of the second-type channel feature hypothesis is carried in first-type report configuration signaling;

(8) the enabling information of the second-type channel feature hypothesis is carried in first-type reference signal measurement configuration signaling; or (9) the enabling information of the second-type channel feature hypothesis is carried in the first-type reference signal measurement restriction signaling.

In an embodiment, the first preset condition may further include one of:

(10) spatial filter repetitive signaling of a first-type reference signal resource set is not configured; or

(11) the spatial filter repetitive signaling of the first-type reference signal resource set is disabled.

In an embodiment, in the first preset condition, conditions that cannot occur simultaneously with conditions (10) and (11) further include:

(12) spatial filter repetitive signaling of a first-type reference signal resource set is configured; or

(13) the spatial filter repetitive signaling of the first-type reference signal resource set is enabled.

In addition, the third-type channel feature hypothesis is determined at least according to one of following reference signals: an interference measurement reference signal generated when the first-type reference signal is sent, an associated reference signal sent to other terminals at the same time, or an interference measurement reference signal of the third-type reference signal associated with the first-type reference signal. Specific types and forms of the third-type reference signal are not specifically limited herein as long as the third-type reference signal is the reference signal associated with the first-type reference signal.

Specifically, the third-type channel feature hypothesis may be a channel feature hypothesis of an interference measurement reference signal and/or an interference channel associated with the first-type reference signal, or description information may be added on the basis of the interference measurement reference signal and/or a data channel and/or a control channel associated with the first-type reference signal so as to determine the third-type channel feature hypothesis. The first-type reference signal and the interference measurement reference signal associated with the first-type reference signal are configured in a same resource or a same resource set or a same resource configuration or a same report configuration, the interference measurement reference signal is an interference measurement reference signal generated at the same time as the base station sends the first-type reference signal, the existence of the interference measurement reference signal may impact the transmission stability of the 5G system, and the impact of the interference measurement signal on the data transmission should be reduced during actual data transmission. Further, the third-type channel feature hypothesis is a channel feature hypothesis of an interference measurement reference signal and/or an interference channel sent simultaneously with the first-type reference signal, or the third-type channel feature hypothesis is determined by the interference measurement reference signal and/or a data channel and/or a control channel sent simultaneously with the first-type reference signal. Further, the third-type channel feature hypothesis may be a channel feature hypothesis of an interference measurement reference signal and/or an interference channel received simultaneously with the first-type reference signal, or the third-type channel feature hypothesis is determined by the interference measurement reference signal and/or a data channel and/or a control channel received simultaneously with the first-type reference signal. Simultaneous reception refers to that when the base station sends the first-type reference signal and the interference measurement reference signal associated with the first-type reference signal to the terminal, the base station does not simultaneously send both of the signals, and the terminal still needs to prepare to simultaneously receive the first-type reference signal and the interference measurement reference signal associated with the first-type reference signal according to the third channel feature hypothesis. In this embodiment, the third-type channel feature hypothesis is mainly carried by the first-type reference signal measurement configuration signaling and/or signaling associated with the first-type reference signal measurement restriction signaling.

Further, the third-type channel feature hypothesis is valid when a second preset condition is satisfied, namely, the terminal needs to consider the channel feature hypothesis when determining the channel state information. When the base station sends the first-type reference signal to the terminal, the second preset condition may be sent to the terminal at the same time; moreover, an indication that the third-type channel feature hypothesis is valid when the terminal specifically satisfies which condition in the second preset condition may be sent to the terminal at the same time. That is, when the terminal receives the third-type channel feature hypothesis and at least one of following conditions is satisfied, the terminal needs to take into consideration the third-type channel feature hypothesis while feeding back the channel state information:

(1) the third-type channel feature hypothesis includes spatial quasi-co-location;

(2) the third-type channel feature hypothesis is associated with a time window;

(3) the third-type channel feature hypothesis is associated with an aperiodic trigger state of the first-type reference signal;

(4) the third-type channel feature hypothesis is associated with activation signaling of the first-type reference signal;

(5) the third-type channel feature hypothesis is carried in the activation signaling of the first-type reference signal;

(6) enabling information of the third-type channel feature hypothesis is carried in first-type reference signal configuration signaling;

(7) the enabling information of the third-type channel feature hypothesis is carried in first-type report configuration signaling;

(8) the enabling information of the third-type channel feature hypothesis is carried in first-type reference signal measurement configuration signaling; or (9) the enabling information of the third-type channel feature hypothesis is carried in the first-type reference signal measurement restriction signaling.

In an embodiment, the second preset condition may further include one of:

(10) spatial filter repetitive signaling of a first-type reference signal resource set is not configured; or

(11) the spatial filter repetitive signaling of the first-type reference signal resource set is disabled.

In an embodiment, in the second preset condition, conditions that cannot occur simultaneously with conditions (10) and (11) further include:

(12) spatial filter repetitive signaling of a first-type reference signal resource set is configured; or

(13) the spatial filter repetitive signaling of the first-type reference signal resource set is enabled.

In this embodiment, upon receiving N channel feature hypotheses, the terminal may determine the channel state information according to the indication in the first-type report configuration signaling associated with the first-type reference signal. The first-type report configuration signaling is used for indicating the terminal to determine the channel state information based on at least one of following channel feature hypotheses: the first-type channel feature hypothesis, the first-type channel feature hypothesis and the second-type channel feature hypothesis, the first-type channel feature hypothesis and the third-type channel feature hypothesis, or the first-type channel feature hypothesis and the second-type channel feature hypothesis and the third-type channel feature hypothesis. It should be appreciated that since the first-type channel feature hypothesis is used as an inherent channel feature hypothesis of the first-type reference signal and corresponds to a channel feature hypothesis of beams actually sent by the base station, the first-type channel feature hypothesis is certainly indicated when the first-type report configuration signaling is used for indication; the second-type channel feature hypothesis actually indicates that the terminal receives another or several virtual sending beams while receiving the beam, the base station may not directly send these virtual sending beams at present, but may schedule or use the virtual sending beams in a subsequent transmission process, therefore the first-type report configuration signaling may inform the terminal whether to consider the second-type channel feature hypothesis or not according to an actual transmission condition of the base station; the third-type channel feature hypothesis actually indicates that the terminal does not receive another or several virtual sending beams while receiving the beams, so that the virtual sending beams are prevented from interfering with the actually sent beams. Therefore, the first-type report configuration signaling may inform the terminal whether to consider the third-type channel feature hypothesis or not according to the interference condition of the base station.

In order to enable this configuration to be used in a subsequent data transmission, a fourth-type reference signal and/or a data channel and/or a control channel may also be configured to be associated with at least one of following channel feature hypotheses of the first-type reference signal: the first-type channel feature hypothesis, the first-type channel feature hypothesis and the second-type channel feature hypothesis, the first-type channel feature hypothesis and the third-type channel feature hypothesis, or the first-type channel feature hypothesis, the second-type channel feature hypothesis and the third-type channel feature hypothesis. The fourth-type reference signal may be the first-type reference signal or the second-type reference signal or the third-type reference signal which are subsequently sent to other users by the base station.

Further, a fifth-type reference signal and/or a data channel and/or a control channel may also be configured to be associated with a sixth-type reference signal, and an association relationship described above is a channel feature hypothesis satisfying at least one or a combination of following conditions: the first-type channel feature hypothesis, or the second-type channel feature hypothesis, or the third-type channel feature hypothesis. It should be appreciated that the use of the fifth-type reference signal and the sixth-type reference signal in this embodiment is intended to indicate that any two reference signals may be associated with each other, and that the fifth-type reference signal and the sixth-type reference signal may be one or more of all reference signals in this embodiment.

According to this embodiment, the N channel feature hypotheses configured on the first-type reference signal are received, the feedback of the channel state information of a receiving end in directions of other specified beams is realized, an indication of the virtual sending beams is effectively supported, and thus the performance of the system is remarkably improved.

Figure 4:
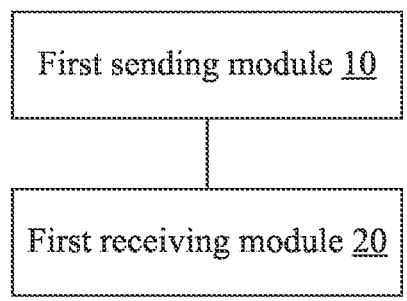
FIG. 4 is a schematic structural diagram of an apparatus for sending a signal in a third embodiment of the present application.

A third embodiment of the present application provides an apparatus for sending a signal. The apparatus is mainly installed in a base station in a 5G system and has a schematic structural diagram as shown in FIG. 4. The apparatus mainly includes a first sending module 10 and a first receiving module 20. The first sending module 10 is configured to send a first-type reference signal to a terminal, where the first-type reference signal is associated with N channel feature hypotheses, and N is an integer greater than or equal to 1. The first receiving module 20 is coupled to the first sending module 10 and is configured to receive channel state information sent by the terminal.

In this embodiment, the first-type reference signal sent by the first sending module 10 to the terminal may represent a potential optional beam through which the base station wishes to perform data transmission with the terminal. The beam may be a resource (e.g., a sending-end spatial filter, a receiving-end spatial filter, sending-end precoding, receiving-end precoding, an antenna port, an antenna weight vector, an antenna weight matrix), and a sequence number of the beam may be replaced with a resource index (e.g., a reference signal resource index), since the beam may be bound with some time-frequency code resources in terms of transmission; the beam may also be a transmission (sending/receiving) manner, which may in particular include a spatial division multiplexing, a frequency/time domain diversity, etc.

The first-type reference signal at least includes one or a combination of several of following signals, for example, a channel state information reference signal, a synchronization signal block, a synchronization signal/physical broadcast channel, and a de-modulation reference signal. Specifically, the first-type reference signal may be composed of at least one of following resources, for example, the first-type reference signal port group, the first-type reference signal resource, the first-type reference signal resource group, the first-type reference signal resource configuration, the first-type reference signal antenna port, or the first-type reference signal antenna port group.

The first-type reference signal sent by the first sending module 10 is associated with N channel feature hypotheses at the same time, where N is an integer greater than or equal to 1. Further, the channel feature hypothesis may be one or more of: quasi-co-location, spatial quasi-co-location, a transmission configuration indication state, spatial filter information, and antenna group information. Parameters involved in the quasi-co-location at least include: Doppler spread, Doppler shift, delay spread, an average delay, an average gain, and a spatial parameter. The spatial filter information may be spatial filter configuration information to be realized by a UE end as wished by the base station, or may be spatial filter configuration information of the base station itself; the antenna group is similar to the spatial filter information, which will not be described in detail here.

The first-type reference signal generally includes following signaling associated with the first-type reference signal: first-type reference signal configuration signaling, first-type report configuration signaling, first-type reference signal measurement configuration signaling, or first-type reference signal measurement restriction signaling. Specifically, the N channel feature hypotheses are carried by at least one or more of the signaling described above, and the N channel feature hypotheses and the first-type reference signal are sent to the terminal at the same time.

In this embodiment, the N channel feature hypotheses at least include one of following types: a first-type channel feature hypothesis, a second-type channel feature hypothesis, or a third-type channel feature hypothesis. The first-type channel feature hypothesis is a channel feature hypothesis of the first-type reference signal, namely, the channel feature hypothesis corresponding to a beam, and is mainly configured on the first-type reference signal resource as an inherent channel feature of this reference signal resource, in other words, if only this reference signal resource is considered, the first-type channel feature hypothesis is an assumed channel feature that needs to be considered from the perspective of the UE end (user end). The second-type channel feature hypothesis is a virtual channel feature hypothesis associated with the first-type reference signal, namely, a channel feature hypothesis of an analog beam, also called a virtual sending beam, which the base station wishes the terminal to receive at the same time. The third-type channel feature hypothesis is an interference channel feature hypothesis associated with the first-type reference signal, namely, a channel feature hypothesis of an analog beam which the base station wishes the terminal to avoid receiving at the same time.

Specifically, the second-type channel feature hypothesis may be a channel feature hypothesis of a reference signal and/or a data channel and/or a control channel associated with the first-type reference signal, or description information may be added on the basis of the reference signal and/or the data channel and/or the control channel associated with the first-type reference signal so as to determine the second-type channel feature hypothesis. The first-type reference signal and the reference signal associated with the first-type reference signal are configured in a same resource or a same resource set or a same resource configuration or a same report configuration; here, the reference signal associated with the first-type reference signal may be any reference signal associated with the first-type reference signal, and does not specifically refer to a specific reference signal. Further, the second-type channel feature hypothesis may be a channel feature hypothesis of a reference signal and/or a data channel and/or a control channel sent simultaneously with the first-type reference signal, or the second-type channel feature hypothesis may be determined by the reference signal and/or the data channel and/or the control channel sent simultaneously with the first-type reference signal. Further, the second-type channel feature hypothesis may also be a channel feature hypothesis of a reference signal and/or a data channel and/or a control channel received simultaneously with the first-type reference signal, or the second-type channel feature hypothesis may be determined by the reference signal and/or the data channel and/or the control channel received simultaneously with the first-type reference signal. Simultaneous reception refers to that when the base station sends the first-type reference signal and the reference signal associated with the first-type reference signal to the terminal, the base station does not simultaneously send both of the signals, and the terminal still needs to prepare to simultaneously receive the first-type reference signal and the reference signal associated with the first-type reference signal according to the second channel feature hypothesis. In this embodiment, the second-type channel feature hypothesis is mainly carried by the first-type reference signal measurement configuration signaling and/or signaling associated with the first-type reference signal measurement restriction signaling.

Further, the second-type channel feature hypothesis is valid when a first preset condition is satisfied. When the first sending module 10 sends the first-type reference signal to the terminal, the first preset condition may be sent to the terminal at the same time; moreover, an indication that the second-type channel feature hypothesis is valid when the terminal specifically satisfies which condition in the first preset condition may be sent to the terminal at the same time. That is, when the terminal receives the second-type channel feature hypothesis and at least one of following conditions is satisfied, the terminal needs to take into consideration the second-type channel feature hypothesis while feeding back the channel state information:

(1) the second-type channel feature hypothesis includes spatial quasi-co-location;

(2) the second-type channel feature hypothesis is associated with a time window;

(3) the second-type channel feature hypothesis is associated with an aperiodic trigger state of the first-type reference signal;

(4) the second-type channel feature hypothesis is associated with activation signaling of the first-type reference signal;

(5) the second-type channel feature hypothesis is carried in the activation signaling of the first-type reference signal;

(6) enabling information of the second-type channel feature hypothesis is carried in first-type reference signal configuration signaling;

(7) the enabling information of the second-type channel feature hypothesis is carried in first-type report configuration signaling;

(8) the enabling information of the second-type channel feature hypothesis is carried in first-type reference signal measurement configuration signaling; or (9) the enabling information of the second-type channel feature hypothesis is carried in the first-type reference signal measurement restriction signaling.

In an embodiment, the first preset condition may further include one of:

(10) spatial filter repetitive signaling of a first-type reference signal resource set is not configured; or

(11) the spatial filter repetitive signaling of the first-type reference signal resource set is disabled.

In an embodiment, in the first preset condition, conditions that cannot occur simultaneously with conditions (10) and (11) further include:

(12) spatial filter repetitive signaling of a first-type reference signal resource set is configured; or

(13) the spatial filter repetitive signaling of the first-type reference signal resource set is enabled.

In addition, the third-type channel feature hypothesis is determined at least according to one of following reference signals: an interference measurement reference signal generated when the first-type reference signal is sent, an associated reference signal sent to other terminals at the same time, or an interference measurement reference signal of the third-type reference signal associated with the first-type reference signal. Specific types and forms of the third-type reference signal are not specifically limited herein as long as the third-type reference signal is the reference signal associated with the first-type reference signal.

Specifically, the third-type channel feature hypothesis may be a channel feature hypothesis of an interference measurement reference signal and/or an interference channel associated with the first-type reference signal, or description information may be added on the basis of the interference measurement reference signal and/or a data channel and/or a control channel associated with the first-type reference signal so as to determine the third-type channel feature hypothesis. The first-type reference signal and the interference measurement reference signal associated with the first-type reference signal are configured in a same resource or a same resource set or a same resource configuration or a same report configuration, the interference measurement reference signal is an interference measurement reference signal generated at the same time as the first sending module 10 sends the first-type reference signal, the existence of the interference measurement reference signal may impact the transmission stability of the 5G system, and the impact of the interference measurement signal on the data transmission should be reduced during actual data transmission. Further, the third-type channel feature hypothesis is a channel feature hypothesis of an interference measurement reference signal and/or an interference channel sent simultaneously with the first-type reference signal, or the third-type channel feature hypothesis is determined by the interference measurement reference signal and/or a data channel and/or a control channel sent simultaneously with the first-type reference signal. Further, the third-type channel feature hypothesis may be a channel feature hypothesis of an interference measurement reference signal and/or an interference channel received simultaneously with the first-type reference signal, or the third-type channel feature hypothesis is determined by the interference measurement reference signal and/or a data channel and/or a control channel received simultaneously with the first-type reference signal. Simultaneous reception refers to that when first sending module 10 sends the first-type reference signal and the interference measurement reference signal associated with the first-type reference signal to the terminal, the first sending module 10 does not simultaneously send both of the signals, and the terminal still needs to prepare to simultaneously receive the first-type reference signal and the interference measurement reference signal associated with the first-type reference signal according to the third channel feature hypothesis. In this embodiment, the third-type channel feature hypothesis is mainly carried by the first-type reference signal measurement configuration signaling and/or signaling associated with the first-type reference signal measurement restriction signaling.

Further, the third-type channel feature hypothesis is valid when a second preset condition is satisfied, namely, the terminal needs to consider the channel feature hypothesis when determining the channel state information, and when the first sending module sends the first-type reference signal to the terminal, the second preset condition may be sent to the terminal at the same time; moreover, an indication that the third-type channel feature hypothesis is valid when the terminal specifically satisfies which condition in the second preset condition may be sent to the terminal at the same time. That is, when the terminal receives the third-type channel feature hypothesis and at least one of following conditions is satisfied, the terminal needs to take into consideration the third-type channel feature hypothesis while feeding back the channel state information:

(1) the third-type channel feature hypothesis includes spatial quasi-co-location;

(2) the third-type channel feature hypothesis is associated with a time window;

(3) the third-type channel feature hypothesis is associated with an aperiodic trigger state of the first-type reference signal;

(4) the third-type channel feature hypothesis is associated with activation signaling of the first-type reference signal;

(5) the third-type channel feature hypothesis is carried in the activation signaling of the first-type reference signal;

(6) enabling information of the third-type channel feature hypothesis is carried in first-type reference signal configuration signaling;

(7) the enabling information of the third-type channel feature hypothesis is carried in first-type report configuration signaling;

(8) the enabling information of the third-type channel feature hypothesis is carried in first-type reference signal measurement configuration signaling; or (9) the enabling information of the third-type channel feature hypothesis is carried in the first-type reference signal measurement restriction signaling.

In an embodiment, the second preset condition may further include one of:

(10) spatial filter repetitive signaling of a first-type reference signal resource set is not configured; or

(11) the spatial filter repetitive signaling of the first-type reference signal resource set is disabled.

In an embodiment, in the second preset condition, conditions that cannot occur simultaneously with conditions (10) and (11) further include:

(12) spatial filter repetitive signaling of a first-type reference signal resource set is configured; or

(13) the spatial filter repetitive signaling of the first-type reference signal resource set is enabled.

In this embodiment, the first-type report configuration signaling of the first reference signal sent by the first sending module 10 may also be used for indicating the terminal to determine the channel state information based on at least one of following channel feature hypotheses: the first-type channel feature hypothesis, the first-type channel feature hypothesis and the second-type channel feature hypothesis, the first-type channel feature hypothesis and the third-type channel feature hypothesis, or the first-type channel feature hypothesis, the second-type channel feature hypothesis and the third-type channel feature hypothesis. It should be appreciated that since the first-type channel feature hypothesis is used as an inherent channel feature hypothesis of the first-type reference signal and corresponds to a channel feature hypothesis of beams actually sent by the first sending module 10, the first-type channel feature hypothesis is certainly indicated when the first-type report configuration signaling is used for indication; the second-type channel feature hypothesis actually indicates that the terminal receives another or several virtual sending beams while receiving the beam, the first sending module 10 may not directly send these virtual sending beams at present, but may schedule or use the virtual sending beams in a subsequent transmission process, therefore the first-type report configuration signaling may inform the terminal whether to consider the second-type channel feature hypothesis or not according to an actual transmission condition of the base station; the third-type channel feature hypothesis actually indicates that the terminal does not receive another or several virtual sending beams while receiving the beams, so that the virtual sending beams are prevented from interfering with the actually sent beams. Therefore, the first-type report configuration signaling may inform the terminal whether to consider the third-type channel feature hypothesis or not according to the interference condition of the base station.

Figure 5:
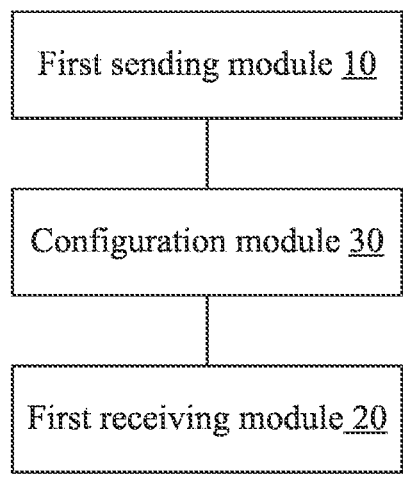
FIG. 5 is a schematic structural diagram of another apparatus for sending a signal in the third embodiment of the present application.

In order to enable this configuration to be used in a subsequent data transmission, the sending apparatus may further include a configuration module 30, at this time, the schematic structural diagram of the sending apparatus is shown in FIG. 5, and the configuration module 30 is coupled to the first sending module 10 and mainly used for configuring a fourth-type reference signal and/or a data channel and/or a control channel with at least one of following channel feature hypotheses of the first-type reference signal: the first-type channel feature hypothesis, the first-type channel feature hypothesis and the second-type channel feature hypothesis, the first-type channel feature hypothesis and the third-type channel feature hypothesis, or the first-type channel feature hypothesis, the second-type channel feature hypothesis and the third-type channel feature hypothesis. The fourth-type reference signal may be the first-type reference signal or the second-type reference signal or the third-type reference signal which are subsequently sent to other users by the first sending module 10.

Further, the configuration module 30 may be further configured a fifth-type reference signal and/or a data channel and/or a control channel to be associated with a sixth-type reference signal, and an association relationship described above is a channel feature hypothesis satisfying at least one or a combination of following conditions: the first-type channel feature hypothesis, or the second-type channel feature hypothesis, or the third-type channel feature hypothesis. It should be appreciated that the use of the fifth-type reference signal and the sixth-type reference signal in this embodiment is intended to indicate that any two reference signals may be associated with each other, and that the fifth-type reference signal and the sixth-type reference signal may be one or more of all reference signals in this embodiment.

The first receiving module 20 is configured to receive the channel state information fed back by the terminal, and after the channel state information fed back by the terminal is received, determine a specific sending-receiving end antenna weight pair for performing the data transmission with the terminal according to a specific content of the channel state information fed back by the first receiving module 20, so as to perform an actual data transmission.

According to this embodiment, the N channel feature hypotheses are configured on the first-type reference signal, the feedback of the channel state information of a receiving end in directions of other specified beams is realized, an indication of the virtual sending beams is effectively supported, and thus the performance of the system is remarkably improved.

Figure 6:
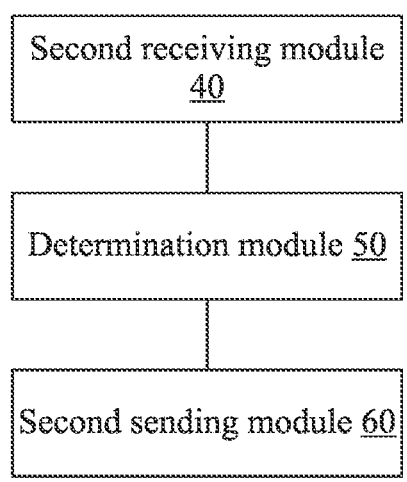
FIG. 6 is a schematic structural diagram of an apparatus for reporting channel state information in a fourth embodiment of the present application.

A fourth embodiment of the present application provides an apparatus for reporting channel state information. The apparatus is mainly installed in a terminal or a UE in a 5G system and has a schematic structural diagram as shown in FIG. 6. The apparatus mainly includes a second receiving module 40, a determination module 50 and a second sending module 60. The second receiving module 40 is configured to receive a first-type reference signal sent by a base station, where the first-type reference signal is associated with N channel feature hypotheses, N is an integer greater than or equal to 1. The determination module 50 is coupled to the second receiving module 40 and is configured to determine channel state information according to the N channel feature hypotheses. The second sending module 60 is coupled to the determination module 50 and is configured to send the channel state information to the base station.

In this embodiment, the first-type reference signal received by the second receiving module 40 may represent a potential optional beam through which the base station wishes to perform data transmission with the terminal. The beam may be a resource (e.g., a sending-end spatial filter, a receiving-end spatial filter, sending-end precoding, receiving-end precoding, an antenna port, an antenna weight vector, an antenna weight matrix), and a sequence number of the beam may be replaced with a resource index (e.g., a reference signal resource index), since the beam may be bound with some time-frequency code resources in terms of transmission; the beam may also be a transmission (sending/receiving) manner, which may in particular include spatial division multiplexing, frequency/time domain diversity, etc.

The first-type reference signal at least includes one or a combination of several of following signals, for example, a channel state information reference signal, a synchronization signal block, a synchronization signal/physical broadcast channel, and a de-modulation reference signal. Specifically, the first-type reference signal may be composed of at least one of following resources, for example, the first-type reference signal port group, the first-type reference signal resource, the first-type reference signal resource group, the first-type reference signal resource configuration, the first-type reference signal antenna port, or the first-type reference signal antenna port group.

The first-type reference signal sent by the base station is associated with N channel feature hypotheses at the same time, where N is an integer greater than or equal to 1. Further, the channel feature hypothesis may be one or more of: quasi-co-location, spatial quasi-co-location, a transmission configuration indication state, spatial filter information, and antenna group information. Parameters involved in the quasi-co-location at least include: Doppler spread, Doppler shift, delay spread, an average delay, an average gain, and a spatial parameter. The spatial filter information may be spatial filter configuration information to be realized by a UE end as wished by the base station, or may be spatial filter configuration information of the base station itself; the antenna group is similar to the spatial filter information, which will not be described in detail here.

The first-type reference signal generally includes following signaling associated with the first-type reference signal: first-type reference signal configuration signaling, first-type report configuration signaling, first-type reference signal measurement configuration signaling, or first-type reference signal measurement restriction signaling. Specifically, the N channel feature hypotheses are carried by at least one or more of the signaling described above, and the N channel feature hypotheses and the first-type reference signal are sent to the terminal at the same time.

The determination module 50 generally determines the channel state information for feedback according to the N channel feature hypotheses associated with the first-type reference signal, and sends the channel state information to the base station through the second sending module 60.

Specifically, when the second receiving module 40 receives the first-type reference signal sent by the base station, the second receiving module 40 may receive the first-type reference signal and a second-type reference signal sent by the base station at the same time, or the base station does not send the first-type reference signal and the second-type reference signal at the same time, but the terminal needs to prepare to receive at the same time. Further, the first-type reference signal and the second-type reference signal are configured in a same resource or a same resource set or a same resource configuration or a same report configuration, or the second-type reference signal at least include a reference signal associated with the first-type reference signal and/or an interference measurement reference signal associated with the first-type reference signal. Then, a reference signal resource set may be determined by the determination module 50 according to the first-type reference signal and/or the second-type reference signal, and then the channel state information is determined according to the reference signal resource set, and is sent to the base station through the second sending module 60, specifically, the number of reference resource sets may be M, where M is an integer larger than or equal to 1, specific content of the reference resource set is a reference signal resource, a reference resource group, a reference resource configuration and the like corresponding to the reference signal.

Figure 7:
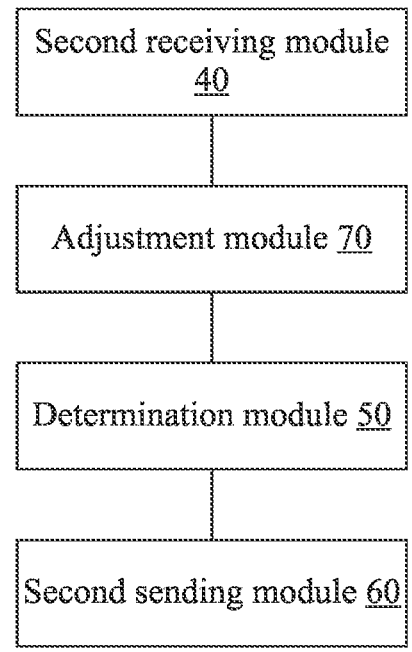
FIG. 7 is a schematic structural diagram of another apparatus for reporting channel state information in the fourth embodiment of the present application.

As shown in FIG. 7, the apparatus for reporting may further include an adjustment module 70. The adjustment module 70 is coupled to the second receiving module 40, and is configured to determine an actual configuration of the spatial filter of the terminal according to N channel feature hypotheses after receiving the N channel feature hypotheses associated with the first-type reference signal, so that a panel in the terminal may perform a reception configuration according to a corresponding channel feature hypothesis upon receiving a beam sent by the base station.

In this embodiment, the N channel feature hypotheses at least include one of following types: a first-type channel feature hypothesis, a second-type channel feature hypothesis, or a third-type channel feature hypothesis. The first-type channel feature hypothesis is a channel feature hypothesis of the first-type reference signal, namely, the channel feature hypothesis corresponding to a beam, and is mainly configured on the first-type reference signal resource as an inherent channel feature of this reference signal resource, in other words, if only this reference signal resource is considered, the first-type channel feature hypothesis is an assumed channel feature that needs to be considered from the perspective of the UE end (user end). The second-type channel feature hypothesis is a virtual channel feature hypothesis associated with the first-type reference signal, namely, a channel feature hypothesis of an analog beam which the base station wishes the terminal to receive the same time. The third-type channel feature hypothesis is an interference channel feature hypothesis associated with the first-type reference signal, namely, a channel feature hypothesis of an analog beam which the base station wishes the terminal to avoid receiving at the same time.

Specifically, the second-type channel feature hypothesis may be a channel feature hypothesis of a reference signal and/or a data channel and/or a control channel associated with the first-type reference signal, or description information may be added on the basis of the reference signal and/or the data channel and/or the control channel associated with the first-type reference signal so as to determine the second-type channel feature hypothesis. The first-type reference signal and the reference signal associated with the first-type reference signal are configured in a same resource or a same resource set or a same resource configuration or a same report configuration; here, the reference signal associated with the first-type reference signal may be any reference signal associated with the first-type reference signal, and does not specifically refer to a specific reference signal. Further, the second-type channel feature hypothesis may be a channel feature hypothesis of a reference signal and/or a data channel and/or a control channel sent simultaneously with the first-type reference signal, or the second-type channel feature hypothesis may be determined by the reference signal and/or the data channel and/or the control channel sent simultaneously with the first-type reference signal. Further, the second-type channel feature hypothesis may also be a channel feature hypothesis of a reference signal and/or a data channel and/or a control channel received simultaneously with the first-type reference signal, or the second-type channel feature hypothesis may be determined by the reference signal and/or the data channel and/or the control channel received simultaneously with the first-type reference signal. Simultaneous reception refers to that when the base station sends the first-type reference signal and the reference signal associated with the first-type reference signal to the terminal, the base station does not simultaneously send both of the signals, and the terminal still needs to prepare to simultaneously receive the first-type reference signal and the reference signal associated with the first-type reference signal according to the second channel feature hypothesis. In this embodiment, the second-type channel feature hypothesis is mainly carried by the first-type reference signal measurement configuration signaling and/or signaling associated with the first-type reference signal measurement restriction signaling.

Further, the second-type channel feature hypothesis is valid when a first preset condition is satisfied, namely, the determination module 50 needs to consider this channel feature hypothesis upon determining the channel state information. When the base station sends the first-type reference signal to the terminal, the first preset condition may be sent to the terminal at the same time; moreover, an indication that the second-type channel feature hypothesis is valid when the terminal specifically satisfies which condition in the first preset condition may be sent to the terminal at the same time. That is, when the second receiving module 40 receives the second-type channel feature hypothesis and at least one of following conditions is satisfied, the determination module 50 needs to take into consideration the second-type channel feature hypothesis while determining the channel state information:

(1) the second-type channel feature hypothesis includes spatial quasi-co-location;

(2) the second-type channel feature hypothesis is associated with a time window;

(3) the second-type channel feature hypothesis is associated with an aperiodic trigger state of the first-type reference signal;

(4) the second-type channel feature hypothesis is associated with activation signaling of the first-type reference signal;

(5) the second-type channel feature hypothesis is carried in the activation signaling of the first-type reference signal;

(6) enabling information of the second-type channel feature hypothesis is carried in first-type reference signal configuration signaling;

(7) the enabling information of the second-type channel feature hypothesis is carried in first-type report configuration signaling;

(8) the enabling information of the second-type channel feature hypothesis is carried in first-type reference signal measurement configuration signaling; or (9) the enabling information of the second-type channel feature hypothesis is carried in the first-type reference signal measurement restriction signaling.

In an embodiment, the first preset condition may further include one of:

(10) spatial filter repetitive signaling of a first-type reference signal resource set is not configured; or

(11) the spatial filter repetitive signaling of the first-type reference signal resource set is disabled.

In an embodiment, in the first preset condition, conditions that cannot occur simultaneously with conditions (10) and (11) further include:

(12) spatial filter repetitive signaling of a first-type reference signal resource set is configured; or

(13) the spatial filter repetitive signaling of the first-type reference signal resource set is enabled.

In addition, the third-type channel feature hypothesis is determined at least according to one of following reference signals: an interference measurement reference signal generated when the base station sends the first-type reference signal, an associated reference signal sent to other terminals at the same time, or an interference measurement reference signal of the third-type reference signal associated with the first-type reference signal. Specific types and forms of the third-type reference signal are not specifically limited herein as long as the third-type reference signal is the reference signal associated with the first-type reference signal.

Specifically, the third-type channel feature hypothesis may be a channel feature hypothesis of an interference measurement reference signal and/or an interference channel associated with the first-type reference signal, or description information may be added on the basis of the interference measurement reference signal and/or a data channel and/or a control channel associated with the first-type reference signal so as to determine the third-type channel feature hypothesis. The first-type reference signal and the interference measurement reference signal associated with the first-type reference signal are configured in a same resource or a same resource set or a same resource configuration or a same report configuration, the interference measurement reference signal is an interference measurement reference signal generated at the same time as the base station sends the first-type reference signal, the existence of the interference measurement reference signal may impact the transmission stability of the 5G system, and the impact of the interference measurement signal on the data transmission should be reduced during actual data transmission. Further, the third-type channel feature hypothesis is a channel feature hypothesis of an interference measurement reference signal and/or an interference channel sent simultaneously with the first-type reference signal, or the third-type channel feature hypothesis is determined by the interference measurement reference signal and/or a data channel and/or a control channel sent simultaneously with the first-type reference signal. Further, the third-type channel feature hypothesis may be a channel feature hypothesis of an interference measurement reference signal and/or an interference channel received simultaneously with the first-type reference signal, or the third-type channel feature hypothesis is determined by the interference measurement reference signal and/or a data channel and/or a control channel received simultaneously with the first-type reference signal. Simultaneous reception refers to that when the base station sends the first-type reference signal and the interference measurement reference signal associated with the first-type reference signal to the terminal, the base station does not simultaneously send both of the signals, and the terminal still needs to prepare to simultaneously receive the first-type reference signal and the interference measurement reference signal associated with the first-type reference signal according to the third channel feature hypothesis. In this embodiment, the third-type channel feature hypothesis is mainly carried by the first-type reference signal measurement configuration signaling and/or signaling associated with the first-type reference signal measurement restriction signaling.

Further, the third-type channel feature hypothesis is valid when a second preset condition is satisfied, namely, the determination module 50 needs to consider the channel feature hypothesis when determining the channel state information. When the base station sends the first-type reference signal to the terminal, the second preset condition may be sent to the terminal at the same time; moreover, an indication that the third-type channel feature hypothesis is valid when the terminal specifically satisfies which condition in the second preset condition may be sent to the terminal at the same time. That is, when the second receiving module 40 receives the third-type channel feature hypothesis and at least one of following conditions is satisfied, the determination module 50 needs to take into consideration the third-type channel feature hypothesis while determining the channel state information:

(1) the third-type channel feature hypothesis includes spatial quasi-co-location;

(2) the third-type channel feature hypothesis is associated with a time window;

(3) the third-type channel feature hypothesis is associated with an aperiodic trigger state of the first-type reference signal;

(4) the third-type channel feature hypothesis is associated with activation signaling of the first-type reference signal;

(5) the third-type channel feature hypothesis is carried in the activation signaling of the first-type reference signal;

(6) enabling information of the third-type channel feature hypothesis is carried in first-type reference signal configuration signaling;

(7) the enabling information of the third-type channel feature hypothesis is carried in first-type report configuration signaling;

(8) the enabling information of the third-type channel feature hypothesis is carried in first-type reference signal measurement configuration signaling; or (9) the enabling information of the third-type channel feature hypothesis is carried in the first-type reference signal measurement restriction signaling.

In an embodiment, the second preset condition may further include one of:

(10) spatial filter repetitive signaling of a first-type reference signal resource set is not configured; or

(11) the spatial filter repetitive signaling of the first-type reference signal resource set is disabled.

In an embodiment, in the second preset condition, conditions that cannot occur simultaneously with conditions (10) and (11) further include:

(12) spatial filter repetitive signaling of a first-type reference signal resource set is configured; or

(13) the spatial filter repetitive signaling of the first-type reference signal resource set is enabled.

In this embodiment, upon receiving N channel feature hypotheses, the second receiving module 40 may specifically determine the channel state information according to the indication in the first-type report configuration signaling associated with the first-type reference signal. The first-type report configuration signaling is used for indicating the terminal to determine the channel state information based on at least one of following channel feature hypotheses: the first-type channel feature hypothesis, the first-type channel feature hypothesis and the second-type channel feature hypothesis, the first-type channel feature hypothesis and the third-type channel feature hypothesis, or the first-type channel feature hypothesis and the second-type channel feature hypothesis and the third-type channel feature hypothesis. It should be appreciated that since the first-type channel feature hypothesis is used as an inherent channel feature hypothesis of the first-type reference signal and corresponds to a channel feature hypothesis of beams actually sent by the base station, the first-type channel feature hypothesis is certainly indicated when the first-type report configuration signaling is used for indication; the second-type channel feature hypothesis actually indicates that the terminal receives another or several virtual sending beams while receiving the beam, the base station may not directly send these virtual sending beams at present, but may schedule or use the virtual sending beams in a subsequent transmission process, therefore the first-type report configuration signaling may inform the terminal whether to consider the second-type channel feature hypothesis or not according to an actual transmission condition of the base station; the third-type channel feature hypothesis actually indicates that the terminal does not receive another or several virtual sending beams while receiving the beams, so that the virtual sending beams are prevented from interfering with the actually sent beams. Therefore, the first-type report configuration signaling may inform the terminal whether to consider the third-type channel feature hypothesis or not according to the interference condition of the base station.

In order to enable this configuration to be used in a subsequent data transmission, a fourth-type reference signal and/or a data channel and/or a control channel may also be configured to be associated with at least one of following channel feature hypotheses of the first-type reference signal: the first-type channel feature hypothesis, the first-type channel feature hypothesis and the second-type channel feature hypothesis, the first-type channel feature hypothesis and the third-type channel feature hypothesis, or the first-type channel feature hypothesis, the second-type channel feature hypothesis and the third-type channel feature hypothesis. The fourth-type reference signal may be the first-type reference signal or the second-type reference signal or the third-type reference signal which are subsequently sent to other users by the base station.

Further, a fifth-type reference signal and/or a data channel and/or a control channel may also be configured to be associated with a sixth-type reference signal, and an association relationship described above is a channel feature hypothesis satisfying at least one or a combination of following conditions: the first-type channel feature hypothesis, or the second-type channel feature hypothesis, or the third-type channel feature hypothesis. It should be appreciated that the use of the fifth-type reference signal and the sixth-type reference signal in this embodiment is intended to indicate that any two reference signals may be associated with each other, and that the fifth-type reference signal and the sixth-type reference signal may be one or more of all reference signals in this embodiment.

According to this embodiment, the N channel feature hypotheses configured on the first-type reference signal are received, the feedback of the channel state information of a receiving end in directions of other specified beams is realized, an indication of the virtual sending beams is effectively supported, and thus the performance of the system is remarkably improved.

A fifth embodiment of the present application provides a storage medium. The storage medium stores a computer program, and the computer program, when executed by a processor, implements steps S11 and S12.

In S11, a first-type reference signal is sent to a terminal, where the first-type reference signal is associated with N channel feature hypotheses, and N is an integer greater than or equal to 1.

In S12, channel state information sent by the terminal is received.

In this embodiment, the storage medium may be installed in a base station of a 5G system. Since the method for sending the signal has been described in detail in the first embodiment, which will not be detailed again in this embodiment.

A sixth embodiment of the present application provides a storage medium. The storage medium stores a computer program, and the computer program, when executed by a processor, implements steps S11 and S12, In S21, a first-type reference signal sent by a base station is received, where the first-type reference signal is associated with N channel feature hypotheses, and N is an integer greater than or equal to 1.

In S22, channel state information is determined according to the N channel feature hypotheses.

In S23, the channel state information is sent to the base station.

In this embodiment, the storage medium may be installed in a user terminal of a 5G system. Since the method for reporting the channel state information has been described in detail in the second embodiment, which will not be detailed again in this embodiment.

In an embodiment, the storage medium described above may include, but is not limited to, various media capable of storing program codes, such as a universal serial bus flash disk (U-disk), a read-only memory (ROM), a random access memory (RAM), a mobile hard disk, a magnetic disk, or an optical disk. In an embodiment, the processor performs the method steps described above according to the program codes stored in the storage medium. Specific examples may be referred to examples described in the above-described embodiments and optional implementations, which will not be described in detail in these embodiments. Apparently, it should be understood by those skilled in the art that each of the above-mentioned modules or steps of the present application may be implemented by a general-purpose computing apparatus, the modules or steps may be concentrated in a single computing apparatus or distributed in a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present application is not limited to any specific combination of hardware and software.

A seventh embodiment of the present application provides an electronic device. The electronic device at least includes a memory and a processor. A computer program is stored in the memory. The processor, when executing the computer program in the memory, implements steps S31 and S32.

In S31, a first-type reference signal is sent to a terminal, where the first-type reference signal is associated with N channel feature hypotheses, and N is an integer greater than or equal to 1.

In S32, channel state information sent by the terminal is received.

In this embodiment, the electronic device may be a base station of a 5G system. Since the method for sending the signal has been described in detail in the first embodiment, which will not be detailed again in this embodiment.

An eighth embodiment of the present application provides an electronic device. The electronic device at least includes a memory and a processor. A computer program is stored in the memory. The processor, when executing the computer program in the memory, implements steps S41 and S43.

In S41, a first-type reference signal sent by a base station is received, where the first-type reference signal is associated with N channel feature hypotheses, and N is an integer greater than or equal to 1.

In S42, channel state information is determined according to the N channel feature hypotheses.

In S43, the channel state information is sent to the base station.

In this embodiment, the electronic device may be may be a user terminal of a 5G system. Since the method for reporting the channel state information has been described in detail in the second embodiment, which will not be detailed again in this embodiment.

A ninth embodiment of the present application provides a base station (gNB) in a 5G transmission system. The actual process of performing a channel feature hypothesis configuration on the base station will be described below with reference to FIG. 8 to FIG. 10.

Figure 8:
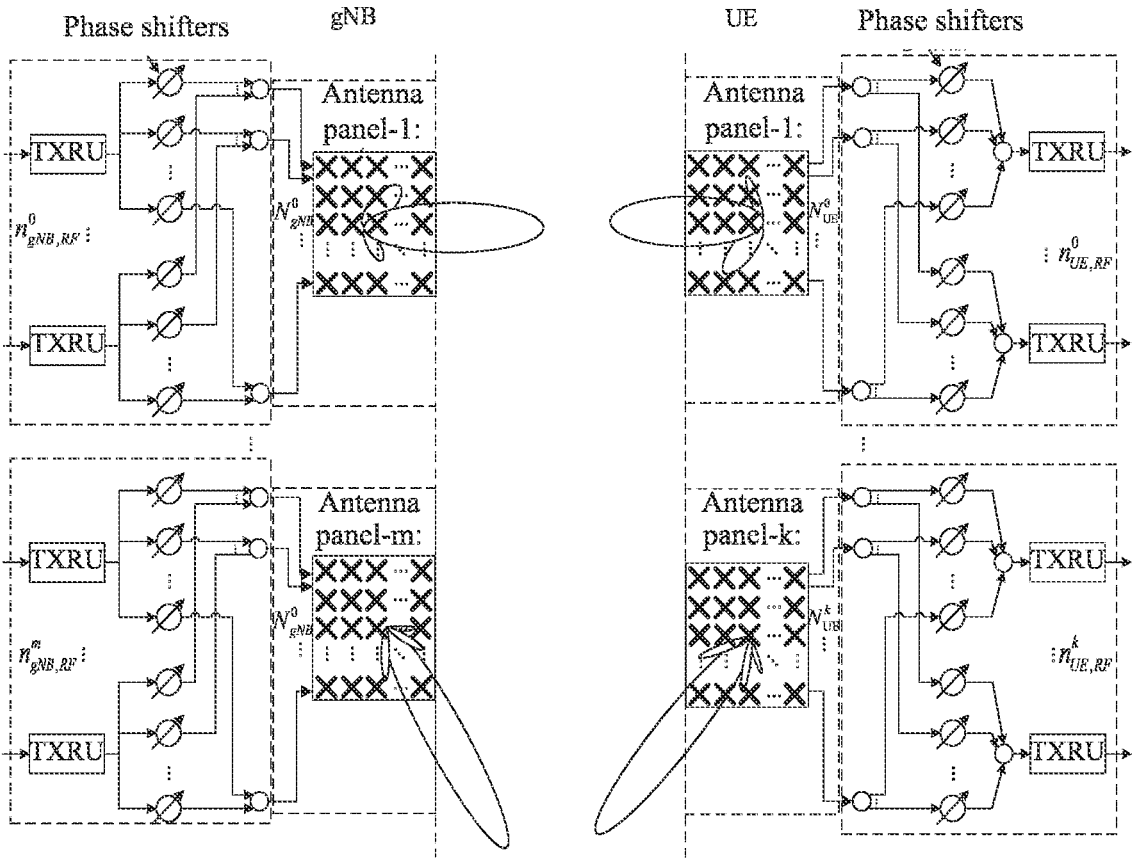
FIG. 8 is a schematic structural diagram of a hybrid precoding transceiver in a ninth embodiment of the present application.

FIG. 8 shows a schematic structural diagram of a hybrid precoding (hybrid analog-to-digital beamforming) transceiver, i.e., a schematic diagram of the structure inside a 5G base station and a 5G terminal, in which each of a system sending end (base station) and a receiving end (UE end) is provided with a multi-antenna array unit (i.e., an antenna panel), also referred to as a panel, each antenna panel containing multiple sending-receiving antennas and multiple transmission reception unit (TXRUs). Each transmission reception unit and the antenna array unit are connected to each other (partial connection scenes are not excluded), and each antenna unit and the TXRU possess a digital keying phase shifter. Through a method of loading different phase shift amounts on signals on respective antenna units, a high-frequency band system realizes the beamforming of an analog end. Specifically, the hybrid beamforming transceiver has multiple radio frequency signal streams. Each signal stream is loaded with an antenna weight vector (AWV) through a digital keying phase shifter, and is sent from multiple antenna units to a high-frequency-band physical propagation channel. At the receiving end, the radio frequency signal streams received by multiple antenna units are weighted and combined into a single signal stream, and after radio frequency demodulation is performed by the receiving end on the single signal stream, multiple receiving signal streams are finally obtained by the receiver, and the receiving signal streams are sampled and received by a digital baseband. Thus, a hybrid precoding (hybrid analog-to-digital beamforming) transceiver may generate radio frequency beams directed in multiple directions at the same time.

Figures 9, 10:
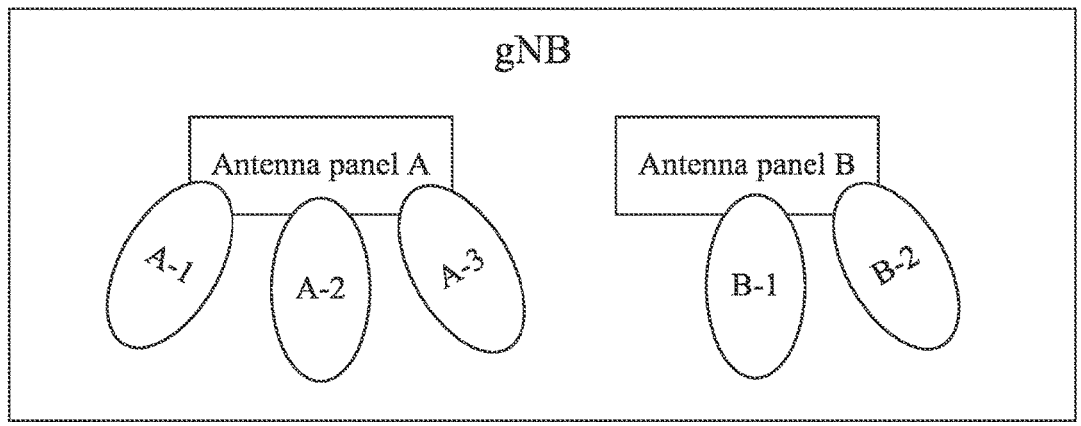
FIG. 9 is a schematic diagram of panels inside a base station in the ninth embodiment of the present application.
FIG. 10 is a schematic diagram of directions of beams sent by a base station in the ninth embodiment of the present application.

FIG. 9 is a schematic diagram of an internal panel of a gNB base station. As can be seen from FIG. 9, there are two panels inside the base station, i.e., Panel-A and Panel-B, respectively. The Panel-A may instruct the panel of a UE to receive a beam in a corresponding direction by sending a reference signal A-1, A-2 or A-3 while sending a beam; similarly, the Panel-B may instruct the panel of the UE to receive a beam in a corresponding direction by sending a reference signal B-1 and B-2 upon sending a beam.

In this embodiment, the Panel-A is a primary panel and the Panel-B is a secondary panel. In general, a physical downlink control channel resource set (CORESET,) is sent through the Panel-A, therefore in a case where the capability of the UE is less than K, its corresponding CORESET comes from the Panel-A by default. As shown in FIG. 10, in a data block {RB0-20} under a slot-{n−3}, the base station sends a reference signal B-2 to a UE1 and directs a beam to a direction corresponding to B-2, and sends a reference signal A-2 to a UE2 and directs a beam to a direction of a corresponding A-2, the UE1 and the UE2 are not related and do not influence each other. However, a situation may arise in which the scheduling on a slot-{n−4} may at the same time schedule data of both the panel A and the panel B in the data block {RB0~20} under a slot-n, i.e., when a beam is sent to a UE3, a sending beam exists in both of the directions corresponding to A-1 and B-1, and then a data block {RB21~RB40} under this slot is scheduled in the slot-n, and at this time, the channel state measurement performed by the UE3 needs to be carried out based on A-1 and B-1 at the same time. That is, under a condition that a beam in the A-1 direction and a beam in the B-1 direction are received at the same time, a channel estimation (represented as A-1|{A-1, B-1}) on a reference signal A-1 is fed back, that is, a report (equivalent to the channel state information in a first embodiment of the present application) under a CSI reporting supporting A-1|{1A-1, B-1} is provided by the UE3, and a relationship between the A-1 and the B-1 satisfies a frequency division multiplexing (FDM) relationship. It should be appreciated that only the case of A-1 and B-1 is given in this embodiment, and that X|{X, Y} may be used in actual implementation to represent channel state information for feedback the X in the case of simultaneous measurement based on X and Y Specifically, CSI reporting calculations need to be performed based on a reported or indicated set of CSI-RS resource indicators (CRIs); that is, {CQI, PMI, RI, CRI|set of CRIB} represents that the channel state information including CQI (channel quality indicator), PMI (precoding matrix indicator), RI (rank indicator) and CRI (channel quality indicator) is fed back under the condition of simultaneously receiving the A-1 and the B-1 described above, and the CQI, the PMI, the RI and the CRI are specific contents in the channel state information fed back by the UE. As to CSI measurement, a downlink reference signal, such as CSI-RS, may be configured with an additional TCI state (i.e., a second-type channel feature hypothesis in the first embodiment of the present application); besides its own TCI (i.e., the first-type channel feature hypothesis in the first embodiment of the present application), the additional TCI is used for describing a channel feature hypothesis for a reference signal that may require to be received potentially.

In specific implementation, the base station may adopt one of following methods:

(1) explicit indication: when a base station sends a downlink reference signal to a terminal, 2 TCI states (equivalent to N channel feature hypotheses in the first embodiment of the present application) may be configured, one TCI is real beam information of the downlink reference signal itself, namely, the first-type channel feature hypothesis, and the other TCI is supporting CSI measurement, or virtual beam information which is valid only when relevant conditions are satisfied, namely, the second type channel feature hypothesis;

(2) implicit indication: a second-type feature hypotheses is acquired through a related reference signal set or subset, the user side assumes that reference signals in the subset need to be received at the same time, but CSI reports may be reported jointly or separately.

At the same time, in a case of multiple users (MIMO, multiple-input multiple-output), channel state information under the avoidance of interference beams needs to be considered. Specifically, the report in the case of the CSI reporting supporting A|{A, ~B} is a channel estimation for A in a case where the UE circumvents B but receives A, where a relationship between A and {A, ~B} is same RB, and the symbol "~" represents the awareness of channel feature hypotheses that circumvent related beams or interfering signals.

For example, in FIG. 10, UE1-{B-2} and UE2-{A-2} are transmitted in a same RB, and the base station should perform precoding based on B-2|{B-2,–A-2} for UE1 and based on A-2|{A-2,–B-2} for UE2. From the perspective of beam indication enhancement, indication of potentially interference beams needs to be enhanced so as to turn off the relevant panel, or trim the beams. Further, when performing beam indication, the base station operates based on {B-2, ~A-2} for UE-1 and based on {A-2, ~B-2} for UE2, further, the base station may instructs the UE to turn off a corresponding panel.

What is claimed is:

1. A method for sending a signal, applied to a base station, comprising:

sending a first-type reference signal to a terminal, wherein the first-type reference signal is associated with a number N of channel feature hypotheses, and N is an integer greater than or equal to 2; and receiving channel state information sent by the terminal, wherein the N channel feature hypotheses comprise: a first-type channel feature hypothesis, and a second-type channel feature hypothesis; and wherein the first-type channel feature hypothesis is a channel feature hypothesis of the first-type reference signal; and the second-type channel feature hypothesis is a virtual channel feature hypothesis associated with the first-type reference signal.

2. A method for reporting channel state information, applied to a terminal, comprising:
receiving a first-type reference signal sent by a base station, wherein the first-type reference signal is associated with a number N of channel feature hypotheses, N is an integer greater than or equal to 2;
determining channel state information according to the N channel feature hypotheses; and
sending the channel state information to the base station, wherein the N channel feature hypotheses comprise: a first-type channel feature hypothesis, and a second-type channel feature hypothesis; and
wherein the first-type channel feature hypothesis is a channel feature hypothesis of the first-type reference signal; and the second-type channel feature hypothesis is a virtual channel feature hypothesis associated with the first-type reference signal.

3. The method of claim 2, wherein after receiving the first-type reference signal sent by the base station, the method further comprises:
determining the channel state information according to at least one of the first-type reference signal or a second-type reference signal.

4. The method of claim 3, wherein the second-type reference signal and the first-type reference signal are configured in a same resource or a same resource set or a same resource configuration or a same report configuration.

5. The method of claim 3, wherein the second-type reference signal comprises at least one of: a reference signal associated with the first-type reference signal, or an interference measurement reference signal associated with the first-type reference signal.

6. The method of claim 2, further comprising:
adjusting a spatial filter of the terminal according to the N channel feature hypotheses.

7. The method of claim 2, wherein the first-type reference signal comprises at least one of: a channel state information reference signal, a synchronization signal block, a synchronization signal/physical broadcast channel, or a demodulation reference signal.

8. The method of claim 2, wherein the N channel feature hypotheses further comprise a third-type channel feature hypothesis.

9. The method of claim 8, wherein the third-type channel feature hypothesis is an interference channel feature hypothesis associated with the first-type reference signal.

10. The method of claim 8, wherein the second-type channel feature hypothesis is carried in at least one of: first-type reference signal measurement restriction signaling, or association signaling of the first-type reference signal measurement restriction signaling.

11. The method of claim 2, wherein the second-type channel feature hypothesis is valid when a first preset condition is satisfied, wherein the first preset condition comprises at least one of:
the second-type channel feature hypothesis comprises spatial quasi-co-location;
the second-type channel feature hypothesis is associated with a time window;
the second-type channel feature hypothesis is associated with an aperiodic trigger state of the first-type reference signal;
the second-type channel feature hypothesis is associated with activation signaling of the first-type reference signal;
the second-type channel feature hypothesis is carried in the activation signaling of the first-type reference signal;
enabling information of the second-type channel feature hypothesis is carried in first-type reference signal configuration signaling;
the enabling information of the second-type channel feature hypothesis is carried in first-type report configuration signaling;
the enabling information of the second-type channel feature hypothesis is carried in first-type reference signal measurement configuration signaling; or
the enabling information of the second-type channel feature hypothesis is carried in the first-type reference signal measurement restriction signaling.

12. The method of claim 8, wherein the third-type channel feature hypothesis is determined according to at least one of following reference signals: an interference measurement reference signal, a multi-user associated reference signal, or an interference measurement reference signal in configuration of a third-type reference signal associated with the first-type reference signal.

13. The method of claim 8, wherein the third-type channel feature hypothesis is at least one of: a channel feature hypothesis of an interference measurement reference signal associated with the first-type reference signal, or a channel feature hypothesis of an interference channel associated with the first-type reference signal; or
the third-type channel feature hypothesis is determined by at least one of: an interference measurement reference signal associated with the first-type reference signal, or an interference channel associated with the first-type reference signal.

14. The method of claim 8, wherein the third-type channel feature hypothesis is at least one of: a channel feature hypothesis of an interference measurement reference signal sent simultaneously with the first-type reference signal, or a channel feature hypothesis of an interference channel sent simultaneously with the first-type reference signal; or
the third-type channel feature hypothesis is determined by at least one of: an interference measurement reference signal sent simultaneously with the first-type reference signal, or an interference channel sent simultaneously with the first-type reference signal.

15. The method of claim 8, wherein the third-type channel feature hypothesis is at least one of: a channel feature hypothesis of an interference measurement reference signal received simultaneously with the first-type reference signal, or a channel feature hypothesis of an interference channel received simultaneously with the first-type reference signal; or
the third-type channel feature hypothesis is determined by at least one of: an interference measurement reference signal received simultaneously with the first-type reference signal, or an interference channel received simultaneously with the first-type reference signal.

16. The method of claim 8, wherein the third-type channel feature hypothesis is valid when a second preset condition is satisfied, wherein the second preset condition further comprises at least one of:
spatial filter repetitive signaling of a first-type reference signal resource set is not configured; or
the spatial filter repetitive signaling of the first-type reference signal resource set is disabled;

or, wherein the third-type channel feature hypothesis is valid when a second preset condition is satisfied, wherein the second preset condition further comprises at least one of:

spatial filter repetitive signaling of a first-type reference signal resource set is configured; or the spatial filter repetitive signaling of the first-type reference signal resource set is enabled.

17. A non-transitory computer-readable storage medium, storing a computer program, wherein the computer program, when executed by a processor, implements the method of claim 1.

18. A non-transitory computer-readable storage medium, storing a computer program, wherein the computer program, when executed by a processor, implements the method of claim 2.

19. An electronic device, comprising a memory and a processor, wherein a computer program is stored in the memory, and the processor, when executing the computer program in the memory, implements the method of claim 1.

20. An electronic device, comprising a memory and a processor, wherein a computer program is stored in the memory, and the processor, when executing the computer program in the memory, is configured to:

receive a first-type reference signal sent by a base station, wherein the first-type reference signal is associated with a number N of channel feature hypotheses, N is an integer greater than or equal to 2;

determine channel state information according to the N channel feature hypotheses; and send the channel state information to the base station, wherein the N channel feature hypotheses comprise: a first-type channel feature hypothesis, and a second-type channel feature hypothesis; and wherein the first-type channel feature hypothesis is a channel feature hypothesis of the first-type reference signal; and the second-type channel feature hypothesis is a virtual channel feature hypothesis associated with the first-type reference signal.

\* \* \* \* \*